US008019528B2

(12) United States Patent
Catanese

(10) Patent No.: US 8,019,528 B2

(45) Date of Patent: Sep. 13, 2011

(54) SYSTEM AND METHOD OF CONTROLLING COMBUSTION PHASING IN AN INTERNAL COMBUSTION ENGINE

(75) Inventor: Alessandro Catanese, Orbassano (IT)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 12/352,463

(22) Filed: Jan. 12, 2009

(65) Prior Publication Data

US 2009/0204313 A1 Aug. 13, 2009

(30) Foreign Application Priority Data

Jan. 14, 2008 (DE) ......................... 10 2008 004 229

(51) Int. Cl.
*B60T 7/12* (2006.01)

(52) U.S. Cl. ... 701/105; 123/435; 123/48 R; 123/406.29

(58) Field of Classification Search .................. 701/101, 701/105, 111, 213; 123/48 R, 48 A, 48 AA, 123/78 A, 78 AA, 434, 435, 673, 406.11, 123/406.16, 406.29, 406.37, 406.41
See application file for complete search history.

(56) References Cited

U.S. PATENT DOCUMENTS 4,785,635 A * 11/1988 Melchior et al. ................ 60/606
5,094,215 A * 3/1992 Gustafson ..................... 123/500
6,415,749 B1 * 7/2002 Sturman et al. ............. 123/70 R
6,672,283 B2 * 1/2004 Kanno ..................... 123/406.59
7,243,529 B2 7/2007 Takemura et al.
7,853,393 B2 12/2010 Kettl et al.
2002/0017277 A1 * 2/2002 Kanno ..................... 123/406.59
2007/0277524 A1 * 12/2007 Dye ................................ 60/602

FOREIGN PATENT DOCUMENTS

DE 10233612 A1 2/2004
DE 102004030567 A1 4/2005
DE 102006024956 A1 12/2007
JP 2001059449 A 3/2001

OTHER PUBLICATIONS

German Patent Office, German Search Report for German Patent Application No. 102008004229.3, Oct. 10, 2008.

* cited by examiner

*Primary Examiner* — John T Kwon

(74) *Attorney, Agent, or Firm* — Ingrassia Fisher & Lorenz, P.C.

(57) ABSTRACT

A system for controlling combustion phasing in an internal combustion engine is provided that includes, but is not limited to a first sensor positioned within a first variable volume combustion chamber and a vibration sensor positioned outside of the first and second variable volume combustion chambers. A first signal from the first sensor is used to control the combustion process in the first variable volume combustion chamber and a combination of the first signal from the first sensor and the second signal from the vibration sensor is used to control the combustion process in the at least one second variable volume combustion chamber.

27 Claims, 2 Drawing Sheets

SYSTEM AND METHOD OF CONTROLLING COMBUSTION PHASING IN AN INTERNAL COMBUSTION ENGINE

CROSS-REFERENCE TO RELATED APPLICATION

This application claims priority to German Patent Application No. 102008004229.3, filed Jan. 14, 2008, which is incorporated herein by reference in its entirety.

TECHNICAL FIELD

The invention relates to a system and method of controlling combustion phasing in an internal combustion engine and to an internal combustion engine including the system.

BACKGROUND

Reciprocating piston engines typically comprise a plurality of variable volume combustion chambers, each chamber being defined by a reciprocating piston in a cylinder bore. The pistons are coupled to a crankshaft which is driven by movement of the piston caused by gas expansion in the chamber. These engines operate by compressing an air/fuel mixture in the working cylinder prior to igniting the mixture or by injecting fuel into hot compressed air to initiate combustion. The crankshaft assembly converts the work generated by the combustion process into torque available at the end of the crankshaft.

The moment of ignition in the cylinders is controlled depending on number of factors such as engine speed and air/fuel ratio. Since an engine typically includes a plurality of cylinders, the combustion process not only has to be controlled in a single cylinder but in all of the cylinders. If the combustion process is improperly controlled, engine knock may occur which releases very large amounts of heat within a short space of time which may cause damage to the piston, cylinder head and cylinder head gasket.

Control of the combustion process is a particular problem in engines which are to be operated in a homogenous charge compression ignition (HCCI) mode, also known as Activated Radical (AR) combustion or Active Thermo-Atmosphere Combustion (ATAC). The HCCI mode is an auto ignition mode which differs from the phenomenon of engine knock in that the reaction rate between the fuel and air is slowed down by diluting the fuel with air and/or exhaust gas so as to produce a combustion which is sufficiently slow so as not to ruin the engine. While HCCI is fuel efficient, it is difficult to control as a large time delay is required between the start of fuel injection and the start of fuel combustion.

It is known to monitor the combustion process using in-cylinder pressure sensors. From the analysis of the combustion pressure inside the cylinder, it is possible to determine the start and the speed of the combustion process. This information can be used to control the combustion process of the next cycle by controlling the fuel injection timing and/or opening and closing of the intake and outlet valves for example.

It is known to position a sensor within each cylinder which has the advantage of providing a detailed and highly accurate measurement of the combustion process which can be used to control the ignition timing. However, the provision of an in cylinder sensor in each of cylinders is expensive and, depending on the engine layout, may not be possible.

It is also known, for example from DE 102 33 612 A1, to control the combustion phasing of a plurality of cylinders by using one or more vibration sensors positioned adjacent the cylinders, for example on the engine head. However, although this arrangement has the advantage of reduced cost, the information which can be gained from this indirect measurement is relatively inaccurate and the improvement in control which can be achieved is limited.

It is, therefore, desirable to provide a system and a method of controlling combustion phasing in an internal combustion engine which overcomes at least some of these problems. In addition, other desirable features and characteristics will become apparent from the subsequent summary and detailed description, and the appended claims, taken in conjunction with the accompanying drawings and this background.

SUMMARY

A system and a method are provided for controlling combustion phasing in an internal combustion engine. The internal combustion engine comprises a first variable volume combustion chamber which is defined by a first piston reciprocating within a first cylinder and at the least one second variable volume combustion chamber, each second variable volume combustion chamber being defined by a second piston reciprocating within a second cylinder. The engine also comprises a crankshaft coupled to and driven by movements of the first and second pistons.

Additionally, two sensing means are provided. A first sensing means is positioned within the first variable volume combustion chamber and is adapted to provide a first signal representative of the combustion process within the first variable volume combustion. A second sensing means in the form of a vibration sensor is positioned outside of the first and second variable volume combustion chambers and is capable of providing a second signal representative of the combustion process within the first as well as within the second variable volume combustion chambers.

The method of controlling combustion phasing in such an internal combustion engine comprises using the first signal from the first sensor positioned within the first variable volume combustion chamber to control the combustion process within the first variable volume combustion chamber and using a combination of the first signal from the first sensor and the second signal from the vibration sensor to control the combustion process within the at least one second variable volume combustion chamber.

The system and the method have the advantage that combustion phasing can be controlled using only one in-cylinder sensor. Therefore, in an embodiment, the second variable volume combustion chambers are provided without in-cylinder sensors. This reduces the cost of the parts as well as the cost of the engine management system. Furthermore, the system and method may be used for engines in which there is insufficient space for accommodating an in-cylinder sensor in each cylinder.

The first sensing means may be a pressure sensor and may be, in the case of a diesel, integrated into the glow plug. Such pressure sensors are known in the art. However, other sensor types could also be used.

The vibration sensor may be provided by a knock sensor which is also capable of providing a signal indicative of engine knock. Therefore, a single vibration sensor can be used to prevent engine knock as well as to control combustion phasing. This has the advantage that the costs are reduced. It is also feasible to provide a plurality of vibration sensors and to use the signal from each of the vibration sensors to control combustion phasing in accordance with a method according to the invention. The vibration sensor may be any vibration sensor known in the art such as a piezoelectric sensor. A knock sensor is also referred to as an acceleration sensor or accelerometer.

In a method of controlling combustion phasing according to an embodiment of the invention, the first signal from the first sensor is used to calculate a global correction factor for controlling the combustion phasing of the first as well as the second variable volume combustion chambers. The global correction factor compensates for variations in the combustion process caused by general engine drift, such as variations in engine temperature, charge temperature and exhaust gas regeneration which affect the combustion process in all of the variable volume combustion chambers.

In addition to variations caused by general engine drift, cylinder to cylinder variations may also arise. These may be caused by non-homogenous exhaust gas regeneration and a non-homogenous temperature distribution or by variations in fuel injection dispersion.

In a further embodiment, the second signal from the vibration sensor is used to produce an adjustment of the combustion process of the at least one second variable volume combustion chamber specific to each of the second variable volume combustion chambers. The combustion process in each cylinder can be adjusted independently. Therefore, variations in the combustion process within the individual cylinders with respect to the combustion process within the other cylinders can be compensated and the combustion phasing controlled by means of only one in-cylinder pressure sensor and a single knock sensor.

In a further embodiment, the second signal from the vibration sensor is used to produce an adjustment of the combustion process in the at least one second variable volume combustion chamber which it is specific to each of the second variable volume combustion chambers. This adjustment of the combustion process within the second variable volume combustion chamber is made relative to the combustion process within the first variable volume combustion chamber as determined by the vibration sensor.

This may be performed by using the second signal from the vibration sensor to calculate a cylinder specific correction factor which compensates for differences in combustion timing, for example a difference in the start of combustion in the second variable volume combustion chamber compared to the start of combustion in the first variable volume combustion chamber. This cylinder specific correction factor is added to the global correction factor calculated form the first signal from the first sensor. The sum of these two correction factors provides a correction factor that is specific for the individual second cylinder. Other merits, other than the start of combustion in the first and second chambers may be used to calculate the cylinder specific correction factor. Any event indicative of the combustion process in the variable volume combustion chambers may be used.

For example, an event indicative of the combustion process in the first and second variable volume combustion chambers is determined from the second signal for all of the cylinders that is the first and second variable volume combustion chambers. This event may be, for example, ignition of the fuel. The second signal from the vibration sensor may comprise a number of peaks each peak corresponding to ignition of the fuel in each of the first and second variable volume combustion chambers.

In some embodiments, a crankshaft position sensor is provided. If a crankshaft sensor is provided, the angular position of the crankshaft at which the event indicative of the combustion process occurs in the first variable volume combustion chamber is determined using the crankshaft sensor and the second signal in combination. Similarly, the angular position of the crankshaft at which the event indicative of the combustion process occurs in the second variable volume combustion chamber is determined using a combination of the second signal from the vibration sensor and the crankshaft sensor. The difference between the angular position of the crankshaft at which the event occurs in the second variable volume combustion chamber and the angular position of the crankshaft at which occurs in the first variable volume combustion chamber may be used to calculate a cylinder specific deviation factor for this second variable volume combustion chamber.

In a further stage of this method, the sum of the cylinder specific correction factor and the global correction factor, obtained from the first signal from the first sensor, is used to produce an adjustment of the combustion process in the second variable volume combustion chamber. This adjustment is specific to the second variable volume combustion chamber. In further embodiment, this method is carried out for each of the second variable volume combustion chambers.

The first signal from the first sensor within the first variable volume combustion chamber may also be used in combination with crankshaft position sensor. For example, the combination of the first signal from the first sensor and the signal from the crankshaft position sensor may be used to determine the angular position of the crankshaft at which a predetermined fraction of the fuel is burnt, most commonly 50%, of the fuel.

The first signal may be used as the feedback for closed loop control of the combustion phasing in the first and second variable volume combustion chambers.

In a further embodiment, a parameter p1 characteristic of the combustion process in the first variable volume combustion chamber is determined from the first signal. A global deviation factor G of the parameter p1 from a predetermined value v of the parameter is calculated. G=(v−p1). The combustion process in the first variable volume combustion chamber is controlled responsive to the global deviation factor G. It should be understood that if there is no deviation of the parameter p1 from the predetermined v, G=0 and no adjustment is performed.

In a further embodiment of this method, a parameter p'1 characteristic of the combustion process in the first variable volume combustion chamber is determined from the second signal. The parameter p'2 characteristic of the combustion process in one of the second variable volume combustion chambers is determined from the second signal. The difference between the parameters p'1 and p'2 is calculated to provide a cylinder specific deviation factor C, whereby C=p'1−p'2.

This cylinder specific deviation factor enables a difference in the timing of the combustion process between the second and first variable volume combustion chambers to be compensated. The difference in the timing of the combustion process may be the difference in the start of the combustion process in the two cylinders.

The cylinder specific deviation factor C is added to the global deviation factor G and the combustion process in the second variable volume combustion chamber is controlled responsive to the sum of the cylinder specific deviation factor and the global deviation factor. In a further embodiment, this method is carried out for each of the second variable volume combustion chambers.

In a further embodiment, the parameter characteristic of the combustion process in the first variable volume combustion chamber obtained from the first signal may be the difference in the measured pressure and a modeled pressure for the chamber. The modeled pressure is indicative of the pressure in the first variable volume combustion chamber if combustion had not occurred.

The parameter p' obtained from the second signal may be determined from a peak in the signal of the vibration sensor which is indicative of ignition in the first and the second variable volume combustion chambers.

In a further embodiment the parameter p' is the angular position of the crankshaft at which a peak in the signal of the vibration sensor indicative of fuel ignition in the first and second variable volume combustion chambers is determined.

The engine may be adapted to be operative in a homogenous charge compression mode. The method may be performed when the internal combustion engine is operating in the homogenous charge ignition mode or when the engine is operating in a conventional combustion mode.

The method may also be performed when the internal combustion engine is operating in a spark ignition mode. The method may, therefore, be used for controlling combustion phasing in a diesel engine as well as a gasoline engine.

Embodiments of the invention also provides a system which can be controlled according to one of the method is previously described and an internal combustion engine and vehicle comprising the system.

The system for controlling combustion phasing in an internal combustion engine as previously described comprises two sensing means according to one of the embodiments previously described. The system also comprises control means adapted to control the combustion process in the first variable volume combustion chamber using the signal from the first sensor and adapted to control the combustion process in the at least one second treble combustion chamber using a combination of the first signal from the first sensor and the second signal from the vibration sensor.

The control means may comprise actuators for controlling the fuel injection and valves, etc., and circuitry including semiconductor integrated circuit chips and memory chips for analyzing the signals provided by the sensors, calculating the correction factors and outputting signals to the actuators for controlling the combustion phasing.

In further embodiments, the system comprises means to control the fuel injection timing in the first and second variable volume combustion chambers. In this case, the control means is also adapted to control the combustion process in the first and second variable volume combustion chambers by controlling the fuel injection timing, intake valve and/or outlet valve. In a further embodiment, the system comprises a crankshaft position sensor which is coupled to the control means.

The system further comprises means to calculate a global correction factor for controlling the combustion phasing of the first and second variable volume combustion chambers from the first signal provided by the first sensor.

The system may further comprise means to determine an event indicative of the combustion process in the first and second variable volume combustion chambers from the second signal for each of the first and second global volume combustion chambers. This means may be adapted to perform peak de-convolution of a signal from the vibration sensor.

The system may also comprise means for calculating the difference in the timing of the event in the second variable volume combustion chamber compared to the timing of the event in the first variable volume combustion chamber in order to provide a cylinder specific correction factor. The timing of the event may be determined from the second signal.

In s further embodiment, the system comprises a crankshaft position sensor and the control means is adapted to determine the angular position of the crankshaft at which the event occurs in the first variable volume combustion chamber from a combination of the second signal and the crankshaft sensor. The control means is also adapted to determine the angular position of the crankshaft at which the event occurs in the second variable volume combustion chamber from a combination of the second signal and the crankshaft sensor. The control means is further adapted to calculate a cylinder specific deviation factor from the difference in the angular position of the crankshaft at which the event occurs in the second variable volume combustion chamber and the angular position of the crankshaft at which the event occurs in the first variable volume combustion chamber.

In further embodiments, the control means is adapted to determine a parameter p1 characteristic of the combustion process in the first variable volume combustion chamber from the first signal and to calculate a global deviation factor G of the parameter p1 from a predetermined value v of this parameter. The control means is also adapted to control the combustion process in the first variable volume combustion chamber responsive to the global deviation factor calculated.

In a further embodiment, the control means is adapted to determine a parameter p', a characteristic of the combustion process in the first variable volume combustion chamber and in the second variable volume combustion chambers from the second signal. The control means is adapted to calculate a cylinder specific deviation factor C from a deviation of the parameter p' of the second variable volume combustion chamber and the parameter p' of the first variable volume combustion chamber. The control means is further adapted to add the cylinder specific deviation factor C to the global deviation factor G and to control the combustion process in the second variable volume combustion chamber responsive to be sum of the cylinder specific deviation factor and the global deviation factor. The control means is also adapted to perform this method and to control the combustion process in all of the second variable volume combustion chambers.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
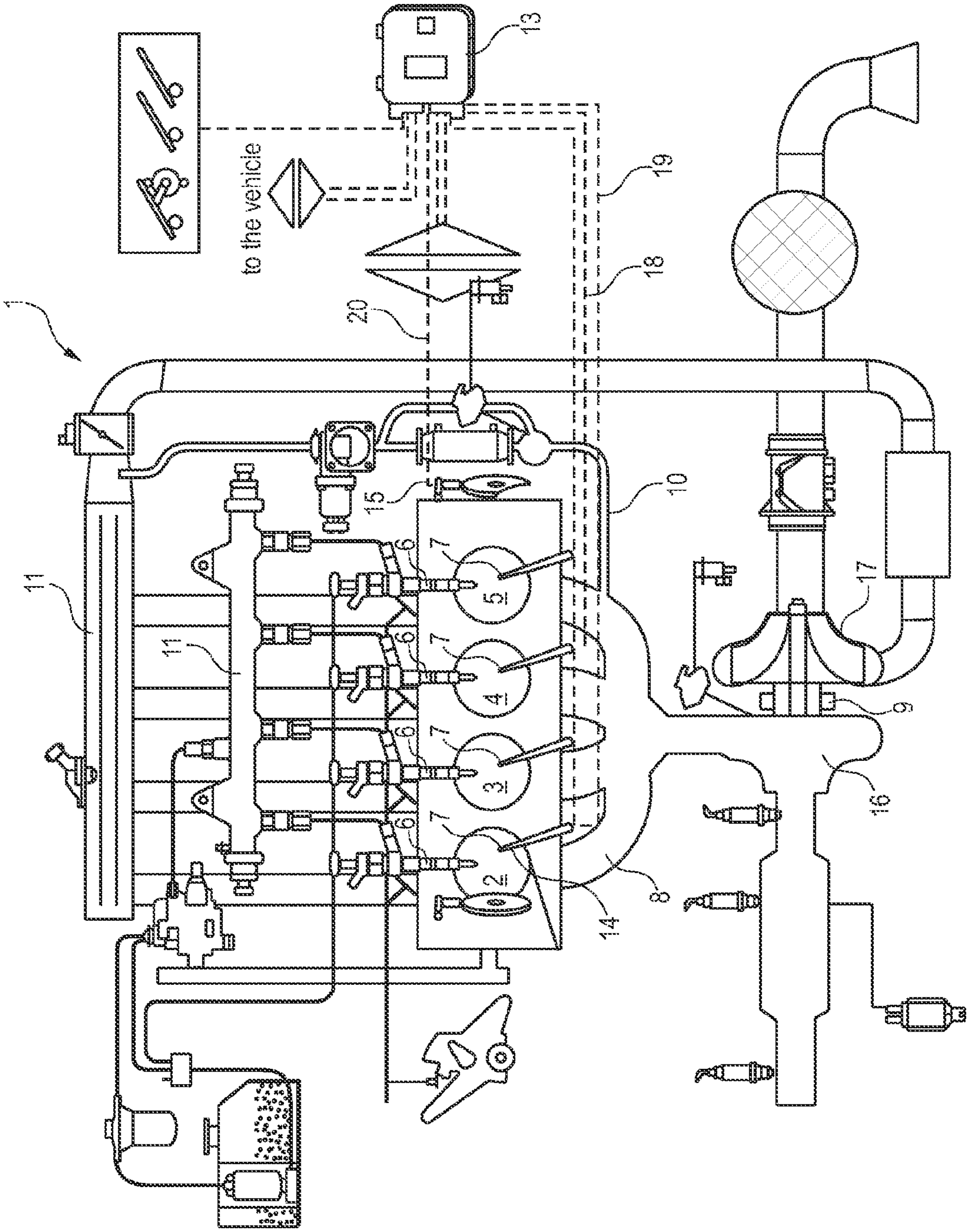
FIG. 1 illustrates a schematic diagram of an internal combustion engine of a vehicle.

FIG. 1 illustrates a schematic diagram of an internal combustion engine 1 comprising four cylinders 2, 3, 4, and 5. Each cylinder is provided with a fuel injection valve 6 and a glow plug 7. FIG. 1 also illustrates an exhaust system 8 which drives turbine 16 of turbocharger 9, an exhaust gas recirculation system 10 and the compressed air, provided by compressor 17 of turbocharger 9, common rail fuel intake system 11 for supplying an air/fuel mixture to each of the cylinders 2, 3, 4 and 5. Also illustrated in FIG. 1 are various conventional sensors and control lines which are not necessarily described if they are not directly used in the method according to an embodiment of the invention.

Figure 2:
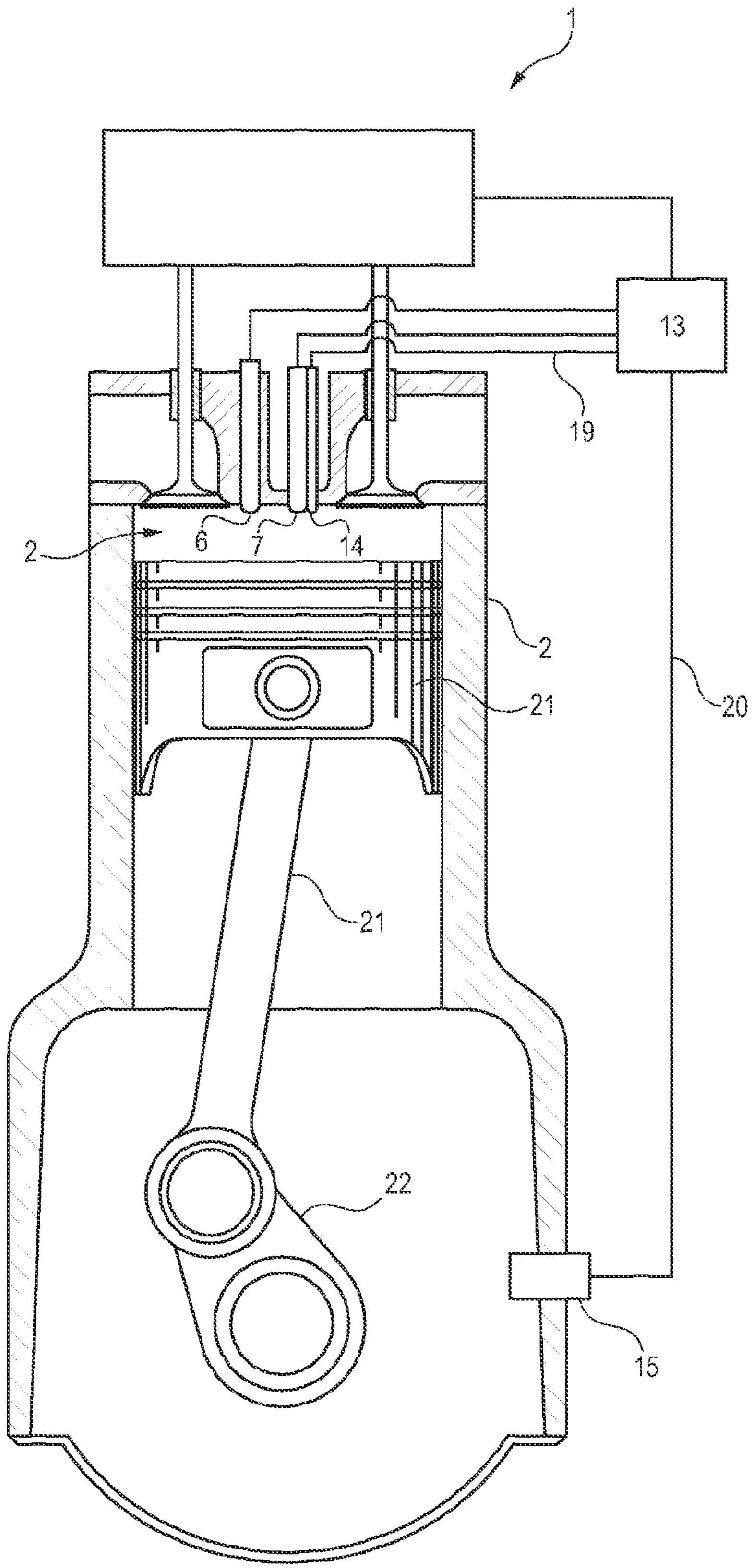
FIG. 2 illustrates a schematic diagram of a cylinder of the combustion engine of FIG. 1.

Each cylinder 2, 3, 4, 5 provides a variable volume combustion chamber which is defined by the cylinder 2, 3, 4, 5 and a piston 21 which reciprocates within each cylinder 2, 3, 4, 5, as illustrated in FIG. 2. The pistons 21 are coupled to crankshaft 22 so that expansion of the air/fuel mixture upon combustion within the cylinders 2, 3, 4, 5 is converted to torque by the crankshaft 22.

The engine is provided with a knock sensor 12, which is positioned on the engine head and coupled to control means 13. This is illustrated by a dashed line 18.

The knock sensor 12 is a vibration sensor and produces a signal from which information about the combustion process in each of the four cylinders 2, 3, 4, 5 can be determined. In addition, knock sensor 12 is also used to provide knock control for the internal combustion engine 1. Knock sensor 12 sends a second signal to control means 13.

A pressure sensor 14 is provided in a single cylinder 2. The remaining cylinders 3, 4, 5 are not provided with an in-cylinder pressure sensor. The in-cylinder pressure sensor 14 may be provided separately or as a pressure sensor integrated with the glow plug 7.

The pressure sensor 14 positioned within the first cylinder 2 provides a first signal to control means 13, indicated by dashed line 19 from which are very detailed picture of the combustion process within the first cylinder 2 can be determined by the control means 13.

The engine 1 also comprises a crankshaft sensor 15 which is coupled to the control means 13 as indicated by dashed line 20 and means 16 to individually control the fuel injection into each of the cylinders 2, 3, 4, 5 by fuel injection valves 6. An alternative embodiment not illustrated in the figures, the engine 1 comprises means for controlling be intake and outlet valves of the cylinders. The combustion process within each cylinder can be controlled by controlling the intake valve, outlet valve and/or fuel injection valves 6 according to a method in accordance with an of the invention.

The combustion phasing in the four cylinders 2, 3, 4 and 5 is controlled by the following process in one embodiment of the method according to an embodiment of the invention.

The in-cylinder pressure sensor 14 provides a first signal to the control means 13 and crankshaft sensor 15 provides a signal to control means 13. From combination of these signals, a parameter p representative of the combustion process within the cylinder 2 is calculated. In this example, the parameter p is the angular position of the crankshaft 22 at which the 50% of the fuel in-cylinder 2 has burnt.

This measured parameter p is compared to a predetermined value v and the difference between the value the measured for the cylinder 2, p, and the predetermined value v is determined and this difference provides a global correction factor G. This value G is indicative of changes in the combustion phasing caused by general engine drift. The combustion process in cylinder 2 is controlled responsive to this global correction factor G.

The knock sensor 12 sends a second signal to the control means 13 from which the control means 13 determines an event indicative of the combustion process in each of the four cylinders. More specifically, the control means 13 determines this event specific to each of the cylinders 2, 3, 4, 5. The event may be fuel ignition since this provides a peak in the signal from the knock sensor 12.

The signal from the knock sensor 12 may, therefore, be analyzed to de-convolute a peak indicative of fuel ignition in each of the four cylinders 2, 3, 4, 5. By using a combination of the signal from the crankshaft sensor 15 and the de-convoluted signal from the knock sensor 12, the timing of fuel ignition in each of the four cylinders 2, 3, 4, 5 can be determined.

Although the information about the fuel ignition process which can be obtained from the knock sensor 12 is less exact than that which is obtained from the in-cylinder pressure sensor 14, the information obtained from the knock sensor 12 is used to provide an additional cylinder specific correction factor C which is added to the global correction factor G and used for controlling the combustion process in the second type of cylinder 3, 4, 5 which are not provided with and in cylinder sensor.

More specifically, the difference in the timing of the event in each of the three second cylinders 3, 4, 5 is determined relative to the timing of the event, in this example, fuel ignition, in the first cylinder 2. Therefore, for each of the second cylinders 3, 4, 5 the difference in timing of the combustion process within the second cylinders 3, 4, 5 compared to the first cylinder 2 is determined so that this difference can be compensated individually for each of the second cylinders 3, 4, 5 as a result of the combination of the global correction factor G calculated from the first signal from the first pressure sensor 14 in the first cylinder 2 and the cylinder specific correction factor C calculated from the second signal from the knock sensor 12.

For example, the second signal ignition in the four cylinders 2, 3, 4, 5 is determined at p'2, p'3, p'4 and p'5, respectively. The cylinder specific correction factor for cylinder 3 is, therefore, p'2−p'3, for cylinder 4 p'2−p'4 and for cylinder 5 p'2−p'5.

The correction factors applied to the four cylinders are therefore, for cylinder 2 G, for cylinder 3 G+(p'2−p'3), for cylinder 4 G+(p'2−p'4) and for cylinder 5 G+(p'2−p'5).

Therefore, the system and method enables not only general drifts in combustion phasing to be compensated but also cylinder to cylinder variations in order to provide improved combustion phasing. Since the method requires only a single in-cylinder pressure sensor and a single knock sensor, costs can be reduced over system requiring an in-cylinder pressure sensor in each of the cylinders.

More particularly, the system and method is particularly advantageous in that it can be used in engine layouts in which it is not physically possible to fit an in-cylinder sensor in each of the cylinders of the engine. Despite only one in-cylinder sensor cylinder to cylinder variations can nevertheless be compensated for by the combined use of the in-cylinder pressure sensor 14 and the knock sensor 12.

The above embodiment of a system and method for controlling combustion phasing has been described in connection with a diesel engine. However, the system and method can also be used to control combustion phasing in a spark ignition or gasoline engine and can also be advantageously used for controlling combustion phasing in an internal combustion engine adapted to be operative in a homogeneous charge compression ignition mode.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method of controlling combustion phasing in an internal combustion engine comprising a first variable volume combustion chamber defined by a first piston reciprocating within a first cylinder, a second variable volume combustion chamber defined by a second piston reciprocating within a second cylinder, and a crankshaft coupled to and driven by a movement of the first piston and the second piston, comprising the steps of:

sensing a first signal representative of a combustion process in the first variable volume combustion chamber;

sensing a second signal representative of the combustion process in the first variable volume combustion chamber and the second variable volume combustion chamber;

controlling the combustion process in the first variable volume combustion chamber based at least in part upon the first signal; and controlling the combustion process in the second variable volume combustion chamber based at least in part upon a combination of the first signal and the second signal.

2. The method according to claim 1, further comprising the step of calculating a global correction factor (G) from the first signal for controlling a combustion phasing of the first variable volume combustion chamber and second variable volume combustion chamber.

3. The method according to claim 1, further comprising the step of producing an adjustment of the combustion process of the second variable volume combustion chamber specific to the second variable volume combustion chamber with the second signal.

4. The method according to claim 1, further comprising the step of producing an adjustment of the combustion process of the second variable volume combustion chamber relative to the combustion process of the first variable volume combustion chamber with the second signal.

5. The method according to claim 2, further comprising the steps of:

calculating a cylinder specific correction factor (C) with the second signal to compensate for a difference in a combustion timing in the second variable volume combustion chamber compared to the combustion timing in the first variable volume combustion chamber; and adding the cylinder specific correction factor (C) to the global correction factor (G) calculated from the first signal.

6. The method according to claim 2, further comprising the steps of:

determining an event indicative of the combustion process in the first variable volume combustion chamber; and determining a second variable volume combustion chamber from the second signal for each of the first variable volume combustion chamber and second variable volume combustion chamber.

7. The method according to claim 6, wherein the event indicative of the combustion process is ignition of a fuel.

8. The method according to claim 6, further comprising the steps of:

determining an angular position of the crankshaft at which the event occurs in the first variable volume combustion chamber using the second signal and a crankshaft position sensor; and determining the angular position of the crankshaft at which the event occurs in the second variable volume combustion chamber using the second signal and a crankshaft sensor; and calculating a cylinder specific deviation factor (C) with a difference between the angular position of the crankshaft at which the event occurs in the second variable volume combustion chamber and the angular position of the crankshaft at which the event occurs in the first variable volume combustion chamber.

9. The method according to claim 8, further comprising the step of producing an adjustment of the combustion process of the second variable volume combustion chamber specific with a sum of a cylinder specific correction factor (C) and the global correction factor (G).

10. The method according to claim 1, further comprising the step of utilizing the first signal as a feedback for a closed loop control of a combustion phasing in the first variable volume combustion chamber and the second variable volume combustion chamber.

11. The method according to claim 1, further comprising the step of controlling the combustion process in the first variable volume combustion chamber and the second variable volume combustion chamber by adjusting a fuel injection timing.

12. The method according to claim 1, further comprising the steps of:

determining a parameter p1 characteristic of the combustion process in the first variable volume combustion chamber from the first signal;

calculating a global deviation factor G of the parameter p1 from a pre-determined value v of a parameter, wherein G=(v−p1); and controlling the combustion process in the first variable volume combustion chamber responsive to the global deviation factor G.

13. The method according to claim 12, further comprising the steps of:

determining a parameter p'1 characteristic of the combustion process in the first variable volume combustion chamber from the second signal;

determining a parameter p'2 characteristic of the combustion process in the second variable volume combustion chamber from the second signal; and determining a deviation of the parameter p'2 of the second variable volume combustion chamber from the parameter p'1 of the first variable volume combustion chamber to provide a cylinder specific deviation factor (C) to compensate for a difference in the start of the combustion process in the second variable volume combustion chamber compared to the start of combustion in the first variable volume combustion chamber, wherein C=(p'1−p'2);

adding the cylinder specific deviation factor (C) to the global deviation factor (G); and controlling the combustion process in said second variable volume combustion chamber responsive to a sum of the cylinder specific deviation factor and the global deviation factor (G+C).

14. The method according to claim 12, wherein the parameter p1 characteristic of the combustion process in the first variable volume combustion chamber is an angular position of the crankshaft at which 50% of a fuel is burnt.

15. The method according to claim 12, wherein the parameter p1 characteristic of the combustion process in the first variable volume combustion chamber is a difference in a measured pressure and a modeled pressure indicative of a pressure in the first variable volume combustion chamber if combustion had not occurred.

16. The method according to claim 13, wherein the parameter p'1 and p'2 characteristic of the combustion process in the first variable volume combustion chamber and the second variable volume combustion chamber is determined from a peak in the signal of the vibration sensor indicative of fuel ignition in said first variable volume combustion chamber and said second variable volume combustion chamber.

17. The method according to claim 13, wherein the parameter p'1 and p'2 characteristic of the combustion process in the first variable volume combustion chamber and the second variable volume combustion chamber is an angular position of the crankshaft at which a peak in the signal of the vibration sensor indicative of fuel ignition in said first variable volume combustion chamber and second variable volume combustion chamber is determined.

18. A system for controlling combustion phasing in an internal combustion engine having a first variable volume combustion chamber defined by a first piston reciprocating within a first cylinder, a second variable volume combustion chamber defined by a second piston reciprocating within a second cylinder, and a crankshaft coupled to and driven by a movement of the first piston and the second pistons, the system comprising:

a first sensor positioned within the first variable volume combustion chamber and adapted to provide a first signal representative of a combustion process in the first variable volume combustion chamber;

a vibration sensor positioned outside of the first variable volume combustion chamber and the second variable volume combustion chamber and capable of providing a second signal representative of the combustion process in the first variable volume combustion chamber and the second variable volume combustion chamber; and a controller adapted to control the combustion process in the first variable volume combustion chamber using the first signal from the first sensor and adapted to control the combustion process in the second variable volume combustion chamber using a combination of the first signal from the first sensor and the second signal from the vibration sensor.

19. The system according to claim 18, wherein the first sensor is a pressure sensor.

20. The system according to claim 18, wherein the vibration sensor is a knock sensor positioned on a head of the internal combustion engine.

21. The system according to claim 18, further comprising a second controller adapted to control a fuel injection timing in the first variable volume combustion chamber and the second variable volume combustion chamber, the second controller further adapted to control the combustion process in the first variable volume combustion chamber and the second variable volume combustion chamber by controlling the fuel injection timing.

22. The system according to claim 18, wherein the controller is further adapted to calculate a global correction factor (G) for controlling the combustion phasing of the first variable volume combustion chamber and second variable volume combustion chamber from the first signal from the first sensor.

23. The system according to claim 18, further comprising an event identifier adapted to determine an event indicative of the combustion process in the first variable volume combustion chamber and the second variable volume combustion chamber from the second signal and second variable volume combustion chamber.

24. The system according to claim 23 further comprising a calculator adapted to calculate a difference in a timing of the event in the second variable volume combustion chamber compared to the timing of the event in the first variable volume combustion chamber to provide a cylinder specific correction factor (C).

25. The system according to claim 24, further comprising a crankshaft position sensor, wherein the controller is further adapted to:

determine an angular position of the crankshaft at which the event occurs in the first variable volume combustion chamber from the second signal and the crankshaft position sensor;

determine the angular position of the crankshaft at which the event occurs in the second variable volume combustion chamber from the second signal and a crankshaft sensor; and calculate a cylinder specific deviation factor (C) from the difference between the angular position of the crankshaft at which the event occurs in the second variable volume combustion chamber and the angular position of the crankshaft at which the event occurs in the first variable volume combustion chamber.

26. The system according to claim 18, Wherein the controller is further adapted to:

determine a parameter p1 characteristic of the combustion process in the first variable volume combustion chamber from the first signal;

calculate a global deviation factor (G) of the parameter p1 from a pre-determined value v of the parameter, wherein G=(v−p1); and control the combustion process in the first variable volume combustion chamber responsive to the global deviation factor (G).

27. The system according to claim 26, wherein the controller is further adapted to:

determine a parameter p'1 characteristic of the combustion process in the first variable volume combustion chamber from the second signal;

determine a parameter p'2 characteristic of the combustion process in the second variable volume combustion chamber from the second signal;

calculate a cylinder specific deviation factor (C) to compensate for a difference in the start of the combustion process in said one second variable volume combustion chamber compared to the start of the combustion in the first variable volume combustion chamber from a deviation of the parameter p'2 of the second variable volume combustion chamber from the parameter p'1 of the first variable volume combustion chamber, wherein C=(p'1−p'2);

add the cylinder specific deviation factor (C) to the global deviation factor (G); and control the combustion process in said second variable volume combustion chamber responsive to a sum of the cylinder specific deviation factor and the global deviation factor (G+C).

* * * * *